United States Patent Office 2,718,505
Patented Sept. 20, 1955

2,718,505
PREPARATION OF ACTIVATED CARBON

Harold T. Baker and Rhea N. Watts, Baton Rouge, La., assignors to Esso Research and Engineering Company, a corporation of Delaware No Drawing. Application September 13, 1950, Serial No. 184,716

4 Claims. (Cl. 252—421)

This invention relates to the preparation of activated carbon suitable for gas adsorption from residual tars and pitches, particularly those derived from petroleum sources. Specifically, the invention is concerned with the preparation of activated carbon by mixing a tar or pitch with an acid sludge and activating the resulting mixture in conventional manner.

It is well known that tars and pitches may be distilled and coked, and the resulting coke treated with steam or inert gas at relatively high temperatures to produce an activated carbon in relatively high yields. However, carbons prepared from tars and pitches possess low surface area and have extremely poor capacity for adsorption of gases such as ethylene and propane. It is also known that acid sludges, e. g. sludges resulting from the treatment of petroleum fractions with sulfuric acid can be similarly treated to produce activated carbons of high surface area and high capacity for adsorption of gaseous hydrocarbons.

It has now been found that activated carbon of high adsorptive capacity can be produced in high yields by mixing tars and/or pitches with acid sludges and converting the mixture to coke which is then activated in the usual manner.

Acid sludges employed in this invention are produced as a result of various petroleum refining operations, particularly the treatment of gasoline, lubricating oil and higher-boiling distillates, with strong sulfuric acid, fuming sulfuric acid, $SO_3$ or mixtures of the same. Acid sludges are particularly produced during the sulfonation of phenol-extracted oils from which the so-called white oils are prepared. The resulting acid layer from the acid treating operations vary in character depending upon the severity of the acid treat and the nature of the feed stock, but in general consists of a carbonaceous residue admixed with unreacted acid, sulfonic acids, other sulfur derivatives and water from which a tarry residue called a sludge is obtained upon settling of the acid layer.

Tars, pitches, bitumens, asphalt, etc. represent the second component of the mixture to be converted to activated carbon. Representative of these materials are coal tar, wood tar, lignite tar, petroleum tar, pitch, bitumen, asphalts, crude petroleum residua, reduced crudes, heavy petroleum fractions, heavy polymers resulting from petroleum treating operations, cracking tars, gilsonite, etc.

The sludge and tar are mixed in proportions varying from 1:1 to 10:1, preferably 2.5:1 to 5:1. The acid sludge is usually a thick, non-fluid mass. When mixed with the tar. pitch, etc. it forms a mobile mass or a fluxed tarry liquid sludge. The liquid mass is first distilled at a slow rate until the temperature reaches about 750° F., the overhead vapors being condensed by means of a water condenser. This distillation removes any aqueous material and the bulk of the volatile matter from the mixture. The next step is a coking operation in which the distillation residue is coked in a reactor at a temperature of 1100° F. to 2000° F., preferably around 1400° F. to 1500° F., and preferably in an inert gaseous atmosphere such as nitrogen, methane, etc. During this operation the oil and other remaining volatile matter is removed or destroyed and a solid coke product is recovered. This crude coke is then subjected to a third treatment which is an activation process to reduce it to activated carbon. In this operation the coke is heated to a temperature of 1100° F. to 1800° F., preferably 1400° F. to 1500° F. with steam, $CO_2$, or flue gas until a yield of 50–60 weight per cent of the coke charged is produced. The product is an activated carbon suitable for gas absorption and is recovered in high yields.

The following table sets forth data obtained on the preparation of activated carbons from tar, sludge, tar-sludge, and tar-acid mixtures.

TABLE

*Preparation of char from tar, sludge, and sulfuric acid*

[Basis: 100 grams' initial charge]

| | Tar | Sludge[1] | Tar+Sludge | Tar+$H_2SO_4$ |
|---|---|---|---|---|
| Initial Charge: | | | | |
| Tar, g | 100.0 | | 28.4 | 33.0 |
| Sludge, g | | 100.0 | 71.6 | |
| Sulfuric Acid, g | | | | 36.8 |
| Water, g | | | | 30.2 |
| Ratio, Sulfuric Acid/Tar | | | 1.0 | 1.1 |
| $H_2SO_4/H_2SO_4+H_2O$ | | 0.57 | 0.54 | 0.55 |
| Distillation (300–750° F.): | | | | |
| Aqueous Material, g | | 50.6 | 37.2 | 44.1 |
| Oil, g | 48.4 | 3.0 | 2.4 | 9.6 |
| Volatile Matter, g | 16.9 | 30.5 | 20.3 | 26.5 |
| Bottoms (coke), g | 34.7 | 15.9 | 40.1 | 19.8 |
| Further Coking (1,400° F.): | | | | |
| Oil & Vol. Matter, g | 18.8 | 5.7 | 22.2 | 8.7 |
| Coke, g | 15.9 | 10.2 | 17.9 | 11.1 |
| From Tar, g | 15.9 | | 10.6 | 11.1 |
| From Sludge, g | | 10.2 | 7.3 | |
| Wt. Percent Coke from Tar | 15.9 | | 37.3 | 33.6 |
| Wt. Percent Coke from Sludge | | 10.2 | 10.2 | |
| Steam Activation (1,400–1,500° F.): | | | | |
| Char, g | 9.6 | 5.0 | 10.1 | 6.5 |
| Wt. Percent Yield on Coke | 60.4 | 49.4 | 56.6 | 58.8 |
| Analysis of Char Sample: | | | | |
| $C_2H_4$ Capacity, mmols/g. (120° F.) | 0.85 | 2.66 | 2.31 | 1.98 |
| $C_3H_8$ Capacity, mmols/g. (120° F.) | 0.94 | 3.81 | 3.10 | 2.69 |
| Surface Area, M²/g | 247 | 1,080 | 852 | 708 |
| Pore Volume, cc./g. Avg | 0.13 | 0.69 | 0.43 | 0.33 |
| Pore Diameter, A. U. Avg | 20.4 | 25.6 | 20.1 | 18.6 |

[1] Sludge is obtained from spent acid. Spent acid is about 87 wt. percent $H_2SO_4$ and contains approximately 5 wt. percent carbon. This spent acid is diluted to about 55 wt. percent $H_2SO_4$ and the sludge, which rises to the top, is separated from the dilute acid. The sludge so obtained contains up to 80 wt. percent dilute acid.

The data demonstrate that the tar alone produced a char of undesirably low adsorptive capacity, and the sludge alone yielded a char of high adsorptive properties but in low yields. The tar-acid mixture produced a char of intermediate adsorptive properties but again in poor yield, only slightly higher than the yields from the sludge alone. The tar-sludge mixture yielded a char whose capacity is only slightly below that obtained from the sludge alone but the yield of the char from an equivalent weight of starting material was twice as much. The absolute capacity of the chars, obtained by multiplying the char yield in grams by the capacity in millimols per gram, represents a true measure of the effectiveness of the char. Thus, from 100 gms. of starting material, viz., tar, sludge, tar-acid and tar-sludge, there was obtained material capable of adsorbing respectively 8.2, 13.3, 12.9 and 23.3 millimols of ethylene; and 9.0, 19.1, 17.5 and 31.3 millimols of propane. The absolute adsorptive capacities of 23.3 and 31.3 produced from the tar-sludge mixture represent an increase of 75% and 64% respectively over the next highest capacities obtained, viz., from the sludge itself.

What is claimed is:

1. A process for the preparation of an activated carbon which comprises distilling a mixture of tar and acid sludge containing 1 to 10 parts by weight of sludge per part of tar to remove water and volatile material therefrom, coking the distillation residue by heating to a temperature of 1100° F. to 2000° F., and activating the resulting coke by treatment with a gaseous activating agent selected from the group consisting of steam, $CO_2$ and flue gas at a temperature of 1100° F. to 1800° F., until a yield of 50 to 60 wt. per cent activated carbon based on the weight of coke is obtained.

2. A process according to claim 1 in which the coking occurs in an inert gaseous atmosphere.

3. A process for the preparation of an activated carbon which comprises distilling a mixture of tar and acid sludge containing 1 to 10 parts by weight of sludge per part of tar to remove water and volatile material therefrom, coking the distillation residue by heating to a temperature of 1100° F. to 2000° F., and activating the resulting coke by treatment with steam at a temperature of 1400° F. to 1500° F., until a yield of 50 to 60 wt. per cent activated carbon based on the weight of coke is obtained.

4. A process according to claim 3 in which the mixture contains acid sludge and tar in a weight ratio of 1:1 to 10:1.

References Cited in the file of this patent

UNITED STATES PATENTS

| | | |
|---|---|---|
| 1,763,102 | Oberle | June 10, 1930 |
| 1,925,438 | Faben | Sept. 5, 1933 |
| 2,393,214 | Andrews | Jan. 15, 1946 |
| 2,412,667 | Arveson | Dec. 17, 1946 |